No. 853,262. PATENTED MAY 14, 1907.
A. E. PUTNAM.
COMPUTING CALIPERS.
APPLICATION FILED JULY 10, 1905.
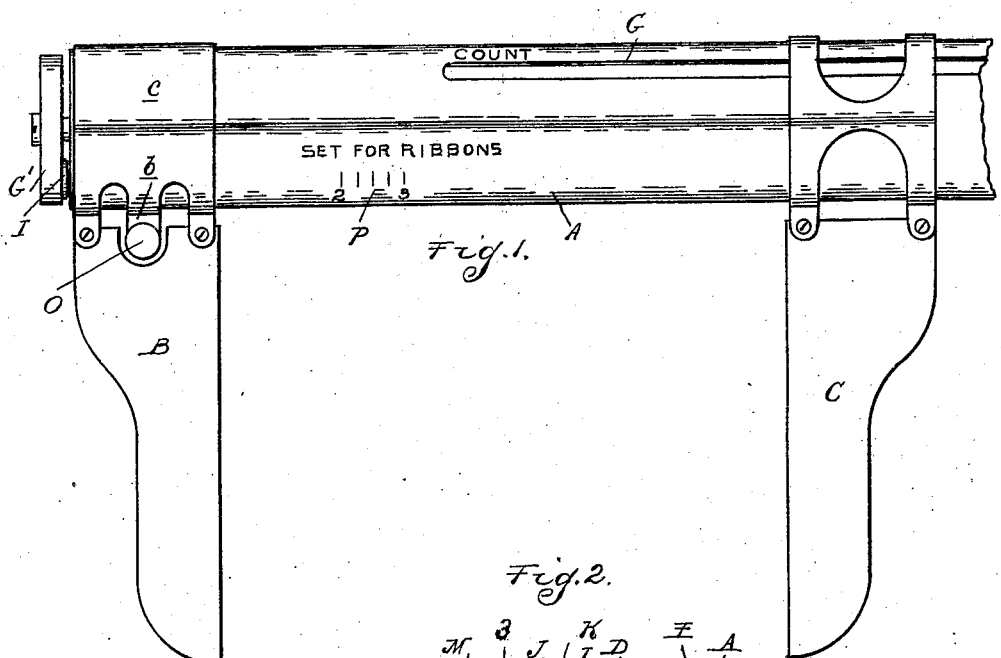
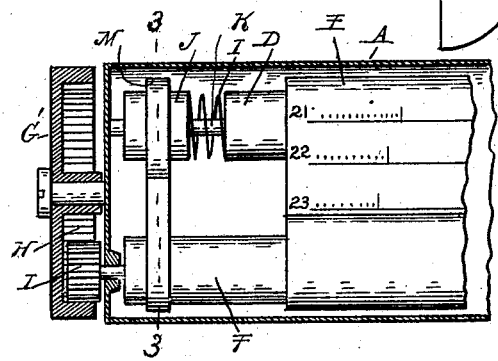
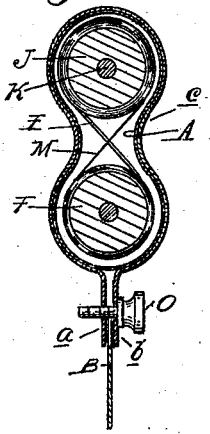

UNITED STATES PATENT OFFICE.

ALFRED E. PUTNAM, OF MILAN, MICHIGAN.

COMPUTING-CALIPERS.

No. 853,262.   Specification of Letters Patent.   Patented May 14, 1907.

Application filed July 10, 1905. Serial No. 269,039.

*To all whom it may concern:*

Be it known that I, ALFRED E. PUTNAM, residing at Milan, in the county of Washtenaw and State of Michigan, a citizen of the United States, have invented certain new and useful Improvements in Computing-Calipers, of which the following is a specification, reference being had therein to the accompanying drawings.

The invention relates to computing calipers and is more particularly designed for use in determining the number of yards of cloth or other material wound upon a bolt.

The method by which the instrument is used in the calculation is to count the number of folds or convolutions of cloth upon the bolt and to caliper the major diameter of the bolt with the cloth thereon, whereupon the number of yards may be closely approximated by the measurement of the calipered length upon a scale corresponding to the number of convolutions.

It is the object of the invention to provide an instrument by the use of which the method as above described can be easily carried out and a reading taken directly from the instrument without reference to any separate charts, scales or tables. It is a further object to obtain in compact form an instrument adapted for a large range of work.

The invention therefore consists in the peculiar construction, arrangement and combination of parts by which the said objects are accomplished as hereinafter set forth.

In the drawings, Figure 1 is an elevation of the instrument; Fig. 2 is a longitudinal section through one end thereof; and Fig. 3 is a cross section substantially on line 3—3 of Fig. 2.

The principle upon which the instrument is constructed is that the increased diameter of a bolt by reason of the winding of one or a plurality of plies of cloth thereon is so nearly proportional to the increase in the length of the convolutions that a substantially accurate determination of the one can be made from the other. Thus by constructing a series of scales each corresponding to a different number of convolutions any linear measurement of the diameter of a bolt of cloth upon the particular scale corresponding to the number of convolutions, will give a reading of the length of cloth on the bolt.

It is obvious that in most mercantile establishments where cloth is sold by retail from the bolt, there are at the time of inventory a large number of partially-used bolts, and that the number of convolutions remaining on these bolts varies through a considerable range. Thus a large number of separate scales are necessary, and if printed on the shank of the caliper, the latter would be of unwieldy size. This objection I have avoided by providing the caliper with a hollow shank and arranging therein a coiled chart of sufficient size to contain the required number of scales. Means are also provided for moving the chart so as to quickly register any desired scale with a reading slot in the casing.

In detail, A is a hollow casing constituting the shank of the caliper, at one end of which is mounted the normally stationary jaw B. C is the adjustable jaw which is slidingly mounted upon said shank. Within the casing A is arranged a longitudinally extending roll D upon which the chart E is wound, one end of said chart being fixedly attached to the roll D. The opposite end of the chart is secured to a second roll F which is arranged parallel to the roll D within the casing.

G is a longitudinally extending slot in the casing adjacent to the roll D with which the various scales upon the chart may be registered by winding the chart from one to the other of the rolls D and F.

For turning the rolls to move the chart, a suitable operating device is provided, preferably a wheel G' journaled at the end of the shank A adjacent to the stationary jaw B and having a drive connection with the rolls. As illustrated, this wheel G' is provided with a flange having an internal gear H formed therein, which meshes with a pinion I secured to the roll F. Thus by turning the wheel G', the roll F will be revolved to wind thereon the chart E, at the same time reeling it off from the roll D. To reverse the operation and wind the chart again upon the roll D, the latter must be revolved in the opposite direction. This could not be successfully accomplished by a positive gear connection with the same operating wheel G', for the reason that the rolls D and F revolve differentially according to the increase and decrease of diameter with added or a diminished number of convolutions of the chart thereon. I have therefore provided a compensating drive connection for the roll D which is actuated from the wheel G' and is preferably of the following construction:—

J is a roll or drum in axial alinement with the roll D and preferably sleeved upon the shaft K of said roll.

I is a yielding connection between the roll or drum J and the roll D preferably in the form of a coiled spring, the opposite ends of which are respectively attached to said drum and roll.

M is a tape or other flexible connection attached at one end to the roll or drum J and at its opposite end to the roll F. The coiling of the tape M upon the rolls J and F is opposite to the coiling of the chart E upon the rolls D and F, and thus when the roll F is actuated in one direction it will wind thereon the chart, while an actuation in the opposite direction will cause the winding thereon of the tape M. As this tape is connected to the roll or drum J and the latter is yieldingly connected through the spring K with the roll D, it is evident that the latter roll will be yieldingly actuated to cause a rewinding of the chart thereon.

The tension of the spring I is sufficient to wind the chart, but it is nevertheless sufficiently yielding to compensate for the differential speed of the two rolls during the winding and rewinding operations. As preferably arranged and as illustrated, the chart and tape are wound oppositely upon the two rolls so as to cross each other between the rolls as shown in Fig. 3.

The construction being as described, in operation the operator having first counted the number of convolutions of cloth upon a bolt, turns the wheel G' until the scale bearing the corresponding number is registered with the slot G. He may then caliper the diameter of the bolt with the cloth thereon, which will shift the jaw C upon the shank A to a position where the reading upon the scale corresponds to the number of yards on the bolt.

For the measurement of cloth upon a flat bolt, the operation is carried on as above described, but where, as in the case of ribbons, the material is wound upon a round bolt, a modification is necessary. This is an adjustment of the stationary jaw B so that the reading taken will allow for a difference between the diameter of a circle and one-half the peripheral length thereof. The adjustment also compensates for different size bolts or spools upon which the ribbon is wound.

As shown, the jaw B is secured in position by a clamp comprising the thumb screw O engaging with the opposite ends *a* and *b* of a split sleeve *c* upon the shank A. This sleeve *c* is secured to the jaw B and whenever the clamping screw O is released, the sleeve may be adjusted longitudinally upon the shank. As indicated at P, the shank is provided with scale markings corresponding to different size bolts, as for example one two inches in diameter, three inches in diameter or fractional differences between.

To determine the number of yards of ribbon upon a bolt, the jaw B is first set by an adjustment of the sleeve *c* to the indication on the scale P corresponding to the diameter of the bolt. When thus set, the number of convolutions of ribbon on the bolt being counted, and the scale corresponding in number being adjusted in registration with the slot G, a reading corresponding to the number of yards is given by calipering the diameter of the bolt with the ribbon thereon.

What I claim as my invention is:—

1. A computing caliper comprising a shank, a coiled chart extending longitudinally thereof, means for simultaneously uncoiling and recoiling said chart, and a jaw adjustable on said shank, a portion of said jaw being operatively located in relation to said chart for indicating on said chart the reading to be taken therefrom.

2. A computing caliper comprising a shank relatively adjustable jaws thereon, a double coiled chart extending longitudinally of said shank, a portion of one of said jaws being arranged in relation to said chart to form an indicator therefor, and means for simultaneously unreeling one coil and reeling the other coil to move said chart laterally past said indicator.

3. In a computing caliper, the combination with a shank, of a fixed and an adjustable jaw thereon, a pair of parallel rolls rotatably secured to said shank, a chart mounted on said rolls adapted to be reeled from one to the other, means for positively operating one of said rolls, and a compensating connection between the rolls.

4. In a computing caliper, the combination with a shank, of a fixed and an adjustable jaw mounted thereon, of a pair of rolls rotatably secured to said shank and extending longitudinally thereof, a chart coiled upon said rolls and secured respectively thereto at its opposite ends, means for positively operating one of said rolls, and a yielding connection between the rolls.

5. In a computing caliper, the combination with a shank and a fixed and an adjustable jaw mounted thereon, of a pair of rolls rotatably secured to said shank and extending longitudinally thereof, a chart secured to and coiled upon said rolls, a rotary member for actuating said rolls in opposite directions and a compensating connection permitting a differential movement of said rolls in their rotation.

6. A computing caliper comprising a hollow shank having a fixed and an adjustable jaw mounted thereon, a pair of parallel rolls journaled within said shank and extending longitudinally thereof, a chart secured to and coiled upon said rolls, a rotary member at one end of said shank having a positive drive connection with one of said rolls, and a yielding drive connection between said rotary member and the opposite roll, whereby the latter may be driven in the opposite direction.

7. In a computing caliper, the combination with a hollow shank and a chart mounted therein, of a jaw adjustable upon said shank, a second jaw normally fixed upon said shank, and means whereby the latter jaw may be set at predetermined points upon said shank.

In testimony whereof I affix my signature in presence of two witnesses.

ALFRED E. PUTNAM.

Witnesses:
JAMES P. BARRY,
EDWARD D. AULT.